United States Patent
Di Vita et al.

[11] 4,028,080
[45] June 7, 1977

[54] METHOD OF TREATING OPTICAL WAVEGUIDE FIBERS

[75] Inventors: Sam Di Vita, West Long Branch; John R. Vig, Colts Neck, both of N.J.

[73] Assignee: The United States of America as represented by the Secretary of the Army, Washington, D.C.

[22] Filed: June 23, 1976

[21] Appl. No.: 699,150

[52] U.S. Cl. ................................. 65/2; 65/3 A; 65/DIG. 7; 134/1; 134/2; 250/504; 350/96 WG
[51] Int. Cl.² .................................. C03C 15/00
[58] Field of Search .............. 65/2, 3 A, DIG. 7; 134/1, 2; 350/96 WG; 21/74 R, 74 A, DIG. 2; 250/504

[56] References Cited

UNITED STATES PATENTS

| | | | |
|---|---|---|---|
| 3,788,827 | 1/1974 | DeLuca | 65/3 A X |
| 3,836,347 | 9/1974 | Ono et al. | 65/2 |

OTHER PUBLICATIONS

Sowell et al., "Surface Cleaning by Ultraviolet Radiation," Journal Vac. Sci. Tech., vol. 11, No. 1 Jan./Feb. 1974, pp. 474–475.
Luckiesl, Applications of Germicidal Erythemal and Infrared Energy, 1946 p. 195.

*Primary Examiner*—Robert L. Lindsay, Jr.
*Attorney, Agent, or Firm*—Nathan Edelberg; Roy E. Gordon; Sheldon Kanars

[57] ABSTRACT

Optical waveguide fibers are cleaned by a dry method involving irradiating the fibers in an oxygen-containing environment with shortwave ultraviolet light.

16 Claims, No Drawings

METHOD OF TREATING OPTICAL WAVEGUIDE FIBERS

The invention described herein may be manufactured, used and licensed by or for the Government for governmental purposes without the payment to use of any royalties thereon.

BACKGROUND OF THE INVENTION

This invention relates in general to a method of treating optical waveguide fibers and, in particular, to a method of cleaning optical waveguide fibers while the fibers are being drawn and during subsequent treatment.

During the process of drawing an optical waveguide fiber, such as glass, the high temperature to which the glass body is subjected causes reduction of some of the dopant oxides to form impurities. These impurities cause absorption losses, thereby increasing attenuation losses to intolerable levels. The dopants used are materials such as titanium oxide, tantalum oxide, tin oxide, niobium oxide, zirconium oxide, and aluminum oxide. After the fibers are drawn, the absorption losses of the fibers can be reduced by heat treating them in an oxygen atmosphere. Prior to heat treatment, the contamination must be removed from the surfaces. During heat treatment, recontamination must be prevented.

U.S. Pat. No. 3,788,827, issued Jan. 29, 1975 to Robert D. DeLuca for "Ionic Treatment of Glass Optical Waveguide Fibers," teaches that glass optical waveguide fibers can be cleaned by ion bombardment by high energy ion beams and then coated with plastic, silicone, metal, or the like to prevent recontamination during heat treatment. U.S. Pat. No. 3,788,827 also suggests cleaning by a combination of ion and electron bombardment which occurs in a gaseous discharge.

The use of ion bombardment cleaning, however, presents some difficulties. That is, the penetration of the ions into the fiber causes roughening of the surface on a microscopic scale. It also causes a change in density and thereby a change in the index of refraction. Ion bombardment can also cause sputtering of nearby materials onto the fibers and induce stresses into the fibers. Then too, electron bombardment can change the chemical structure of the surface of the glass fiber, that is, it can decompose silicon dioxide. These processes are also costly to use.

SUMMARY OF THE INVENTION

The general object of this invention is to provide a method of treating optical waveguide fibers. A further object of the invention is to provide such a method that is simpler and less expensive to implement than the use of ion bombardment or gaseous discharge. Another object of the invention is to provide such a method in which the difficulties of ion bombardment and gaseous discharge are overcome. A particular object of the invention is to provide a dry method for cleaning a glass optical waveguide fiber while the fiber is being drawn and during subsequent treatment.

The foregoing object have now been attained by a method using short wavelength ultraviolet light to irradiate the glass optical waveguide fibers. More particularly, according to the invention, a glass optical waveguide fiber is cleaned by irradiating the fibers in an oxygen-containing environment with shortwave ultraviolet light.

The optical waveguide fiber material used may be a fiber made from inorganic materials. Particularly preferred is the use of glass comprising fused silica with a doped core.

The irradiation with shortwave ultraviolet light is carried out in oxygen-containing environment that may be pure dry air, a mixture of pure oxygen and inert gas, or pure oxygen. The irradiation of the fiber with shortwave ultraviolet light is complete in less than 30 seconds. By the term shortwave ultraviolet light as used herein is meant light between 1,700 and 2,700 angstroms in length with at least one of the wavelength emitted by the shortwave ultraviolet light source being less than 2,400 angstroms in length.

DESCRIPTION OF THE PREFERRED EMBODIMENT

EXAMPLE 1

A cylindrical furnace is lined with a helical source of shortwave ultraviolet light. The path length in the furnace can be adjusted to allow for the required exposure time for cleaning. In this instance, the helical source is a low pressure mercury tube with a fused quartz envelope in the form of a helix. The low pressure mercury tube emits two important wavelengths - 1,849 angstroms and 2,537 angstroms. The wavelength of 1,849 angstroms is important because it is absorbed by oxygen, and it thus leads to the generation of ozone. The wavelength of 2,537 angstroms is important because it is absorbed by hydrocarbons and also by ozone. The absorption by ozone of the 2,537-angstroms wavelength, and of the infrared wavelengths present due to heat, destroys the ozone. Therefore, ozone is continuously being formed and destroyed in the furnace. An intermediate product of both the formation and destruction processes is atomic oxygen which is extremely strong oxidizing agent.

Glass optical waveguide fiber is fed through the end of the cylindrical furnace at a rate which permits the use of conventional fiber drawing facilities. The center of the tub is maintained at a temperature of about 1,000° C. While the fiber moves through the furnace, it is irradiated with shortwave ultraviolet light for up to 30 seconds. When the fiber passes out of the other end of the furnace, it is nearly atomically clean as determined by Auger Electron Spectroscopy. This treatment with shortwave ultraviolet light and heat can be performed while the fiber is being drawn, or anytime thereafter.

EXAMPLE 2

Glass optical waveguide fibers are heat treated by continuous feeding into a cylindrical furnace, the inside wall of which is covered with a helical source of shortwave ultraviolet light. At the center of the cylindrical furnace is a cylindrical source of shortwave ultraviolet light which is coaxial with the furnace and with the helical source of shortwave ultraviolet light. Both sources of ultraviolet light are high pressure mercury discharge tubes in sapphire envelopes. Glass optical waveguide fibers are fed through small openings in the sides of the furnace in between the turns of the helical source of shortwave ultraviolet light and are wound onto a sapphire tube covering the cylindrical source of shortwave ultraviolet light. The sapphire tube rotates so that the fibers are continuously wound and unwound from this cylinder. The fibers remain in the furnace for less than 30 seconds. The unwound fibers are then fed through small exit holes in the sides of the furnace, in between the turns of the helical source of shortwave ultraviolet light and diametrically opposed from the entrance holes. The glass fibers are thus irradiated from all directions as they pass through the furnace. The furnace is maintained at about 1,000° C. The combination of shortwave ultraviolet light, atomic oxygen, and heat produce near atomically clean surfaces on the fibers. The presence of atomic oxygen facilitates the reoxidation of the oxides which had been reduced by the heat treatment.

EXAMPLE 3

A glass optical waveguide fiber is first drawn, cleaned with shortwave ultraviolet light and heat as described above, and then coated with a plastic resin on all surfaces, except the optical ends, to form an optical cable. The cable is then mounted into an optical metallic connector whose optical surface has become contaminated during the fabrication and during the subsequent handling and storage. Immediately prior to use, the optical surface in the connector is exposed to short wavelength ultraviolet light in an oxygen-containing atmosphere for up to 30 seconds to produce a near atomically clean optical surface.

EXAMPLE 4

Glass optical waveguide fiber is fed through the end of the cylindrical furnace at a rate which permits the use of conventional fiber drawing facilities. The center of the tube is maintained at a temperature of about 1,000° C. While the fiber moves through the furnace, it is irradiated with shortwave ultraviolet light for up to 30 seconds. When the fiber passes out of the other end of the furnace, it is nearly atomically clean, as determined by Auger Electron Spectroscopy. Immediately after the completion of this cleaning/oxidation procedure, a protective coating is deposited so as to form an hermetic seal on all surfaces except the optical ends. This coating can be a metal such as aluminum or an insulator such as silicon nitride, tin oxide, etc. The method of deposition can be vacuum evaporation, sputtering, a dip in molten metal, or polymerization in a glow discharge.

Various modifications are seen as coming within the scope of the invention. For example, in the embodiment shown in Example 2, many glass fibers could be heat-treated in parallel simultaneously. The furnace would have small slits at the side and ultrapure gases would be inside the furnace at a slight positive pressure.

We wish it to be understood that we do not desire to be limited to the exact details as described, for obvious modifications will occur to a person skilled in the art.

What is claimed is:

1. Method of treating glass optical waveguide fibers, said method comprising irradiating the fibers at about 1,000° C in an oxygen-containing environment with shortwave ultraviolet light, wherein the shortwave ultraviolet used has two important wave lengths between 1700 and 2700 angstroms, with at least one wavelength being less than 2400 angstroms in length and capible of being absorbed by oxygen to generate ozone, the other wavelength capible of being absorbed by hydrocarbons and ozone.

2. Method according to claim 1 wherein the oxygen containing environment is selected from the group consisting of pure dry air, a mixture of pure oxygen and inert gas, and pure oxygen.

3. Method according to claim 1 wherein the glass optical waveguide is fused silica with a doped core.

4. Method according to claim 3 wherein, immediately after optical waveguide fiber is treated with shortwave ultravoilet light, the fiber is coated with a plastic resin on all surface except the optical ends to form a optical cable, the cable then mounted into an optical metallic connector whose optical surface has become contaminated during the fabrication and during the subsequent handling and storage; and wherein, immediately prior to use, the optical surface in the connector is exposed to short wavelength ultraviolet light in an oxygen-containing atmosphere for up to 30 seconds to produce a near atomically clean optical surface.

5. Method according to claim 1 wherein the shortwave ultraviolet used emits at 1,849 angstroms and 2,537 angstroms.

6. Method according to claim 1 wherein the source of the shortwave ultraviolet used is a low pressure mercury tube with a fused quartz envelope in the form of a helix.

7. Method according to claim 3 wherein the source of the shortwave ultraviolet used is a low pressure mercury tube with a fused quartz envelope in the form of a helix.

8. Method according to claim 1 wherein the source of shortwave ultraviolet used is a high pressure mercury discharge tube in a sapphire envelope.

9. Method according to claim 3 wherein the source of shortwave ultraviolet used is a high pressure mercury discharge tube in a sapphire envelope.

10. Method according to claim 1 wherein, immediately after the optical waveguide fiber is treated with shortwave ultraviolet light, the fiber is coated with a plastic resin on all surfaces except the optical ends to form an optical cable, the cable then mounted into an optical metallic connector whose optical surface has become contaminated during the fabrication and during the subsequent handling and storage; and wherein, immediately prior to use, the optical surface in the connector is exposed to short wavelength ultraviolet light in an oxygen-containing atmosphere for up to 30 seconds to produce a near atomically clean optical surface.

11. Method according to claim 3 wherein, immediately after the optical waveguide fiber is treated with shortwave ultraviolet light, a protective coating is deposited so as to form an hermetic seal on all surfaces of the fiber except the optical ends.

12. Method according to claim 1 wherein the optical waveguide fiber is treated while the fiber is being drawn.

13. Method according to claim 3 wherein the optical waveguide fiber is treated while the fiber is being drawn.

14. Method according to claim 1 wherein the optical waveguide fiber is treated after the fiber has been drawn.

15. Method according to claim 3 wherein the optical waveguide fiber is treated after the fiber has been drawn.

16. Method according to claim 1 wherein, immediately after the optical waveguide fiber is treated with shortwave ultraviolet light, a protective coating is deposited so as to form an hermetic seal on all surfaces of the fiber except the optical ends.

* * * * *